United States Patent [19]

Schatz

[11] Patent Number: 5,279,355
[45] Date of Patent: Jan. 18, 1994

[54] METHOD FOR THE PRODUCTION OF A HEAT STORAGE MEANS AND A HEAT STORAGE MEANS ADAPTED FOR THE METHOD

[76] Inventor: Oskar Schatz, Waldpromenade 16, D-W—8035 Gauting, Fed. Rep. of Germany

[21] Appl. No.: 722,978

[22] Filed: Jun. 28, 1991

[51] Int. Cl.⁵ ............................................. F28D 20/00
[52] U.S. Cl. ................................ 165/10; 165/906; 165/41; 123/41.14
[58] Field of Search ............................ 165/10, 906, 41; 123/41.14

[56] References Cited

U.S. PATENT DOCUMENTS 3,289,423  12/1966  Berner et al. ................. 220/445
4,709,750  12/1987  White ............................ 165/10

FOREIGN PATENT DOCUMENTS 3614318  10/1987  Fed. Rep. of Germany ........ 165/10

Primary Examiner—Albert W. Davis, Jr.
Attorney, Agent, or Firm—Harness, Dickey & Pierce

[57] ABSTRACT

For the production of a heat storage means, more particularly in the form of latent heat storage means, for vehicle heating systems run on heat from the engine, comprising a housing, which is made up of an outer container and in inner container arranged in spaced relationship to the outer container so as to include an insulating zone between them, a heat storage core arranged in the inner container and having at least one chamber for a storage medium in it, said chamber being separated by a partition wall from at least one flow path for a heat transfer medium, and an inlet duct and outlet duct for the heat transfer medium, such ducts being connected with the flow path and extending outwards through the insulating zone, a high quality insulation may be produced without thermal damage in a substantially shorter period of time, which is economically acceptable and the insulation may be sufficiently long lasting for use in automobiles, if after the insulating zone has been heated after the production of the housing for degassing and has been evacuated, the bake out is performed at a temperature which is substantially above the operational temperature of the core and said components of the heat storage core are then protected against any temperature-dependent damage to the heat storage core.

7 Claims, 2 Drawing Sheets

METHOD FOR THE PRODUCTION OF A HEAT STORAGE MEANS AND A HEAT STORAGE MEANS ADAPTED FOR THE METHOD

BACKGROUND OF THE INVENTION

The invention relates to a method for the production of a heat storage means, more particularly in the form of a latent heat storage means, for vehicle heating systems run on heat from the engine, comprising a housing, which is made up of an outer container and in inner container arranged in spaced relationship to the outer container so as to include an insulating zone between them, a heat storage core arranged in the inner container and having at least one chamber for a storage medium in it, said chamber being separated by a partition wall from at least one flow path for a heat transfer medium, and an inlet duct and outlet duct for the heat transfer medium, such ducts being connected with the flow path and extending outwards through the insulating zone, the insulating zone having been baked out after the production of the housing for degassing and having been evacuated, and to a heat storage means for performing the method.

In the case of vehicle heating systems there is the general aim of being able to store heat overnight so that when starting up in the morning there is sufficient stored heat until the engine cooling water has attained its operating temperature. Taking into account the normal requirements in vehicle construction as regards low weight and a low overall size, the quality of the insulation desired in the heat storage means may only be attained by having a double-walled housing, which encloses the storage core on all sides and has an insulating vacuum in its double walling. In this respect it may be a question of a high vacuum or of insulation in the form of microporous materials as for instance powders or fibers, the space between them being additionally evacuated. Therefore housings comprising an outer container and an inner container are utilized, an insulating zone being present between, through which the inlet duct and the outlet duct extend for the heat transfer medium. Therefore thermal losses may be caused by convection and thermal conduction in the heat transfer medium, for instance in the form of the engine cooling water or of the engine exhaust gas. A heat storage means with such insulation is described in the German patent publication 3,614,318 A for instance.

The effectiveness of the insulation of such heat storage means is dependent on the one hand on the use of vacuum technology, which has long been known, and on the other hand on the sealed design of the insulating vessel with its inner and outer containers so that the thermal conduction by solid structures is limited to the inlet and outlet ducts and to the means supporting the inner container in the outer container. The conduction of heat via the inlet and outlet ducts with a small cross section and long paths may be kept relatively low.

After the mechanical part of the production of such a heat storage housing the desired insulating effect is able to be achieved by evacuation of air from the insulating zone within a few minutes. This insulating effect is however not permanent, because it is possible for materials to be absorbed on the surfaces, which delimit the insulating zone, of the outer and inner containers, of any radiation shields positioned in the insulating zone, on microscopic insulating materials and also on the essential fittings in the insulating zone, that is to say the inlet and outlet ducts and on the means supporting the inner container, such materials evaporating in the course of time so that the pressure in the insulating zone is increased and the insulating effect of the vacuum is reduced.

For this reason vacuum-insulated vessels are degassed for a prolonged period of time after the mechanical production of the equipment, the insulating zone being continually evacuated. In order to reduce the degassing time to for instance 24 hours the insulating vessel is heated to an elevated temperature during evacuation, this being termed baking out. Experience has shown that an increase in the temperature of 10° C. results in halving the degassing time.

It is furthermore known that a significant source of contamination in vacuum vessels is water adsorbed on the walls. For the removal of the water three distinct temperature stages are possible that is to say approximately 120° C. with low rates of evaporation, 180° C. with very evaporation rates and approximately 360° C. with a practically 100% evaporation.

It is also known that during the degassing the long term effect is dependent on the minimum temperature which is reached on the surfaces in the insulating zone. It follows from this that for a given long term effect all surfaces defining the insulating zone will have to reach the minimum temperature or to exceed it.

For the full scale application to automobile construction a long term effect of the vacuum is necessary, which requires a baking out in the second stage range at 180° C. The operational temperature of heat storage means of this type is however at 90° C. and the maximum temperature necessary is 125° C. The bake out temperature necessary for the production of a good vacuum is consequently substantially above the operational temperature which is later to be expected. The result of this is that there is the problem of thermal damage to the heat storage means during the process of production, as for instance owing to increased vapor pressure of the heat storage media employed, or owing to degradation of the supporting parts in the heat storage core, for instance synthetic resins, due to thermal expansion.

SHORT SUMMARY OF THE PRESENT INVENTION

Accordingly one object of the invention is to devise a process for the production of heat storage means of the type initially mentioned such that a high quality insulation may be produced without thermal damage in a substantially shorter period of time, which is economically acceptable. More particularly the insulation is to be sufficiently long lasting for use in automobiles. Furthermore the a heat storage means is to be so designed that in its production it makes possible the use of the method in accordance with the invention.

In order to achieve these or other objects appearing from the present specification, claims and drawings bake out is performed at a temperature which is substantially above the operational temperature of the heat storage means and in this respect the temperature-sensitive components of the heat storage core are protected against damage due to the effects of temperature.

The type of protection for the temperature-sensitive components of the heat storage core is dependent on the type of possible damage to the heat storage core, which inherently—as mentioned above—may directly result from the thermal sensitivity of the materials which are used and/or from the load on the materials caused by thermal expansion of the mechanical components of the heat storage core or from excessively high vapor pressures in the heat storage medium.

In accordance with a further possible development of the invention at least during the bake out the heat storage core is thermally insulated from the insulating zone, and in accordance with a further advantageous developments an insulating space between the heat storage core and the inner container is either filled at least during bake out of the insulating zone with a gas having a low thermal conductivity or is evacuated.

In accordance with a further advantageous embodiment of the invention during the bake of the insulating zone the elevated vapor pressure acting on the partitions of the chamber containing the heat storage medium is supported and in accordance with a convenient embodiment of the invention during bake out a static pressure is built up in the flow paths in the inner container in order to compensate for the elevated vapor pressure of the heat storage medium.

In accordance with a further convenient further development of the invention during bake out the inner container is filled with a liquid, whose temperature-dependent vapor pressure function is so selected that it compensates the vapor pressure of the heat storage medium during bake out, such liquid being hermetically sealed off during bake out in the inner container. Preferably, the inner container is in this case filled with ethylene glycol.

In accordance with another convenient development of the invention during bake out a cooling medium is caused to pass through the flow path, such cooling medium being for instance a mixture of ethylene glycol and water.

In the case of a heat storage means with an insulating gap between an outer surface, which surrounds the heat storage core between two end surfaces, in which the flow path, which runs through the heat storage core, ends and, respectively, begins, and the inner container, there is the possibility of a further advantageous development such that the flow of the cooling medium through the insulating gap is shut off between the end surfaces so that the medium, which is prevented from flowing, is heated up and prevents any undesired cooling down of the inner container during bake out.

Another very advantageous form of the invention in the case of a heat storage means with an insulating gap which is between an outer surface, which surrounds the heat storage core between two end surfaces, in which surfaces the flow path, which runs through the heat storage core, ends and, respectively, begins, and the inner container, there is the feature that at the start of bake out the cooling medium is heated up generally at the operational temperature range of the heat storage means and the during bake up is kept in such temperature range. As a result the desired bake out temperature is attained more rapidly and during bake out an excessive cooling of the inner container is prevented.

The evacuation of the insulating zone is a high-cost operation, for which reason it is desirable for the duration of this step to be as short as possible. Therefore in accordance with a further embodiment of the invention the heat storage core is firstly preheated with a fluid functioning as a heat transfer medium at the maximum permitted temperature of the heat storage core and it is then held at this temperature level until the bake out operation is completed.

In this respect the fluid functions as a heating medium until the desired temperature level is reached and thereafter, until the termination of the bake out operation at a bake out temperature exceeding the maximum permitted temperature of the heat storage core, as a cooling medium.

In accordance with a further convenient development of the invention the method is in this respect such that the evacuation of the insulating zone starts with a time lag after the preheating of the heat storage core, it being more particularly advantageous if the heat storage means with a preheated heat storage core is moved into a bake out station in which the insulating zone is baked out and evacuated.

In order to perform the method, a heat storage means comprising a housing, which is made up of an outer container and an inner container arranged in spaced relationship to the outer container so as to include an insulating zone between them, a storage core arranged in the inner container and having at least one chamber with a storage medium in it, said chamber being separated by a partition wall from at least one flow path for a heat transfer medium, and an inlet duct and outlet duct for the heat transfer medium, such ducts being connected with the flow path and extending outwards through the insulating zone, has the further development that the heat storage core is supported with a clearance between it and the inner wall surface of the inner container and the space between the inner container and the heat storage core is connected with the flow. Therefore there is the possibility, during the bake out of the space between the inner container and the heat storage core, of supplying the space between the inner container and the heat storage core with a thermally insulating gas, via the conducting connection, which leads to the outside and during operation of the heat exchanger provides the flow connection in the heat storage core, or of evacuating this space. However it is possible also, during bake out, for instance using the thermally insulating gas, for a static pressure to be built up in the flow paths, such pressure compensating for the elevated vapor pressure, which occurs during bake out, of the heat storage medium. Finally there is also the possibility, during the bake out stage, of charging with a liquid as for instance ethylene glycol, via the duct connection, the temperature-dependent vapor pressure characteristic thereof being so selected that it compensates for the vapor pressure of the heat storage medium during bake out.

Preferably the heat storage core is supported in the inner container by means of support elements of thermally insulating material, which is resistant to heating in the bake out temperature range.

In accordance with a yet further development of the invention the inlet and outlet ducts open into the inner container, in which at the ends of the heat storage core, at the flow paths extending through the heat storage core open, respectively between the inner container and the heat storage core a collecting space is held free for the heat transfer medium.

In the case of heat storage means in whose heat storage core the chamber for the heat storage medium is divided up into a number of chamber parts, which are separated and the flow path for the heat transfer medium is separated into a plurality of ducts extending between the chamber parts and the ducts, is enclosed by thin partition walls and have a shallow cross section so that the long sides of their cross sections are adjacent to each other, there is the possibility of a further development of the invention such that the distance between these flat cross section sides of adjacent chamber parts is so sized that these cross section sides mutually support each other under the influence of the vapor pressure increasing the cross section of the chamber parts before the expansion of the walls of the chamber parts exceeds a safety threshold.

In the case of a heat storage means in whose heat storage core the chamber for the heat storage medium is divided up into a plurality of chamber parts and the flow path is divided up into a plurality of ducts extending between these chamber parts, the duct and the chamber parts being separated from each other by thin partition walls, there is the possibility of a further convenient development of the invention such that the partition walls are connected with each other by spacers so that forces due to increased vapor pressure and/or thermal expansion are taken up. In accordance with a convenient further development the spacers are connected with the partition walls in a tension transmitting manner and may consequently resist any increased vapor pressure in the space, in which the spacers are arranged.

Furthermore more particularly in cases in which during bake out the flow path for the heat transfer medium has a cooling medium flowing around it, a further possibility consists in an arrangement in which the spacers are arranged in the ducts for the heat transfer medium. Owing to the uptake of heat by the coolant the vapor pressure thereof increases so that the vapor pressure of the coolant may also endanger the thin partition walls between the ducts and the chamber parts for the heat storage medium. The forces acting on the partition walls under the influence of the vapor pressure are taken up as tensile forces by the spacers.

In accordance with an advantageous development of the invention the heat storage core is surrounded by a core casing, which is supported on the inner container.

As part of a still further possible development of the invention the between two end surfaces, at which the ducts belonging to the flow path open, the core casing has an surface between opposite ends thereof, which with the formation of an insulating gap is opposite to the surface of the inner container between opposite ends thereof, this insulating gap being filled, if desired, with a microporous insulating material. Preferably the insulating gap is however connected with at least one of the collecting spaces in order to permit flow to or flow through of a coolant serving for cooling the heat storage core. If the insulating gap is only connected with one of the collecting spaces the coolant in the insulating gap will come to rest and be heated up so that in the manner already mentioned any cooling of the inner container will be prevented.

The invention will now be described in more detail with reference to the accompanying drawings, which show several working embodiments thereof.

LIST OF THE SEVERAL VIEWS OF THE FIGURES

DETAILED ACCOUNT OF WORKING EMBODIMENTS OF THE INVENTION

Figure 1:
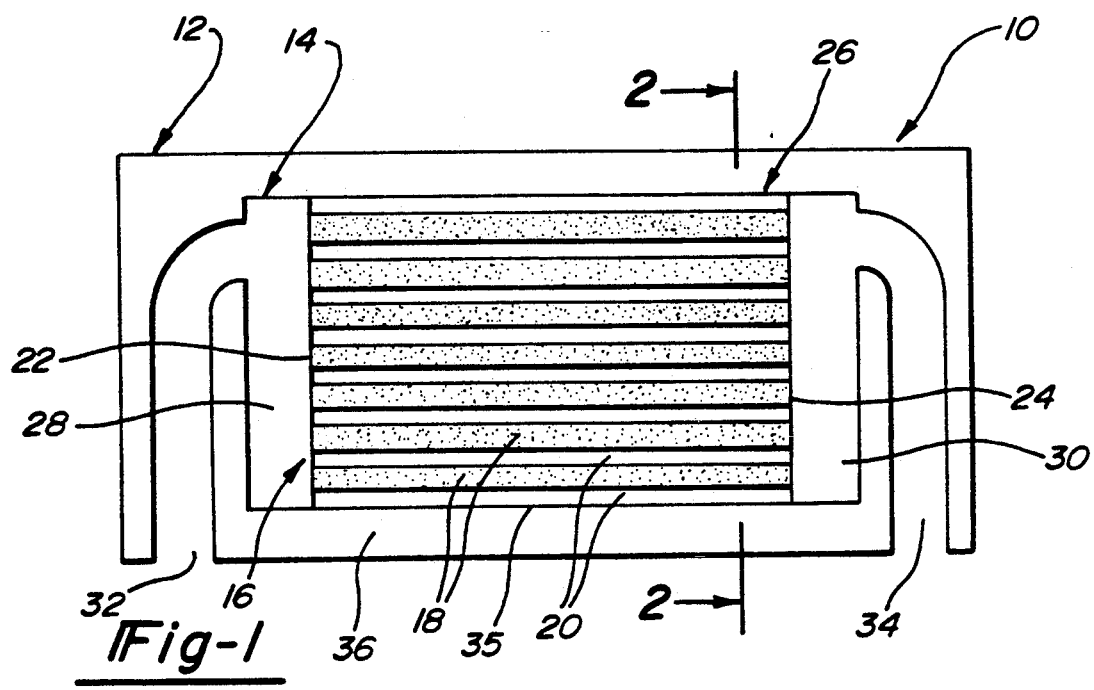
FIG. 1 shows a diagrammatic longitudinal section taken through a latent heat storage means for motor vehicles and which is suitable for performing the method in accordance with the invention.

The illustrated heat storage means has a housing generally referenced 10 and consisting of an outer container 12 and an inner container 14 which is mounted therein with a clearance on all sides, the means supporting the inner container 14 in the outer one 12 in order to constitute an insulating vessel not being illustrated. In the inner container 14 a heat storage core 16 is arranged, in which the storage zone 18 for the heat storage medium has a plurality of mutually parallel ducts 20 running through it for a heat transfer medium, the arrangement being such that the ducts 20 emerge at two mutually remote end surfaces 22 and, respectively, 24 of the heat storage core 16 which is surrounded by a core casing 26 and at this position respectively opens into collecting spaces 28 and, respectively, 30 for the heat transfer medium.

Figure 2:
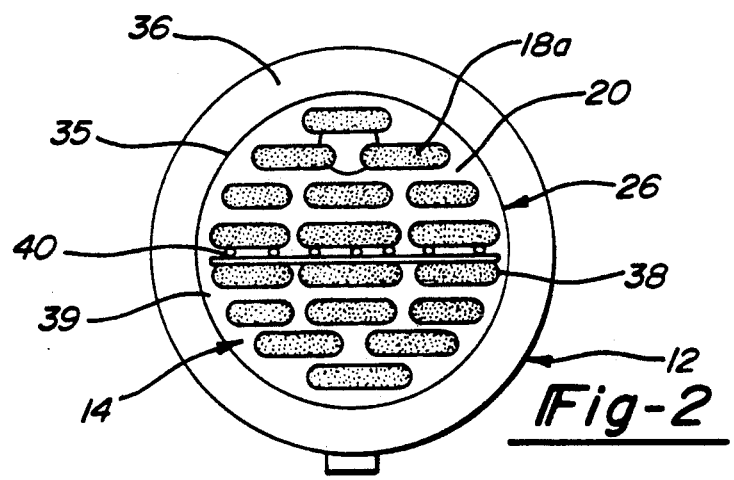
FIG. 2 shows a cross section taken through the heat storage means thereof in accordance with a first embodiment of the invention.
Figure 3:
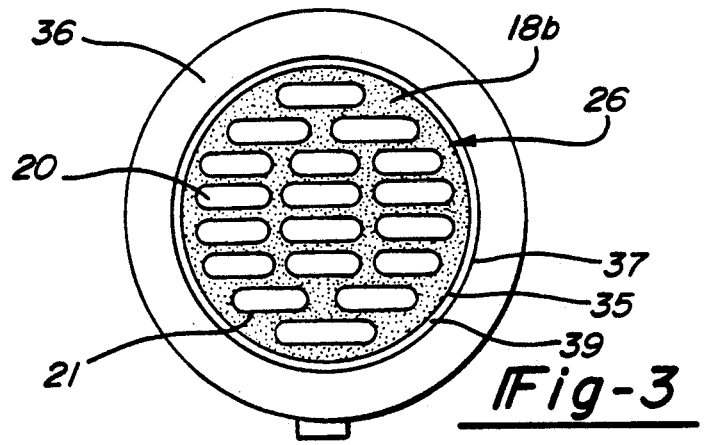
FIG. 3 shows a similar cross section albeit taken through another embodiment of the invention.

FIGS. 2 and 3 illustrate two different embodiments of the heat storage core 16 surrounded by the core casing 26.

In the case of the design in accordance with FIG. 3 the core casing surrounds a group of flat chamber parts 18a, which are parallel to each other, are arranged with a gap between them in order to constitute the ducts 20 and are filled with heat storage medium.

Figure 4:
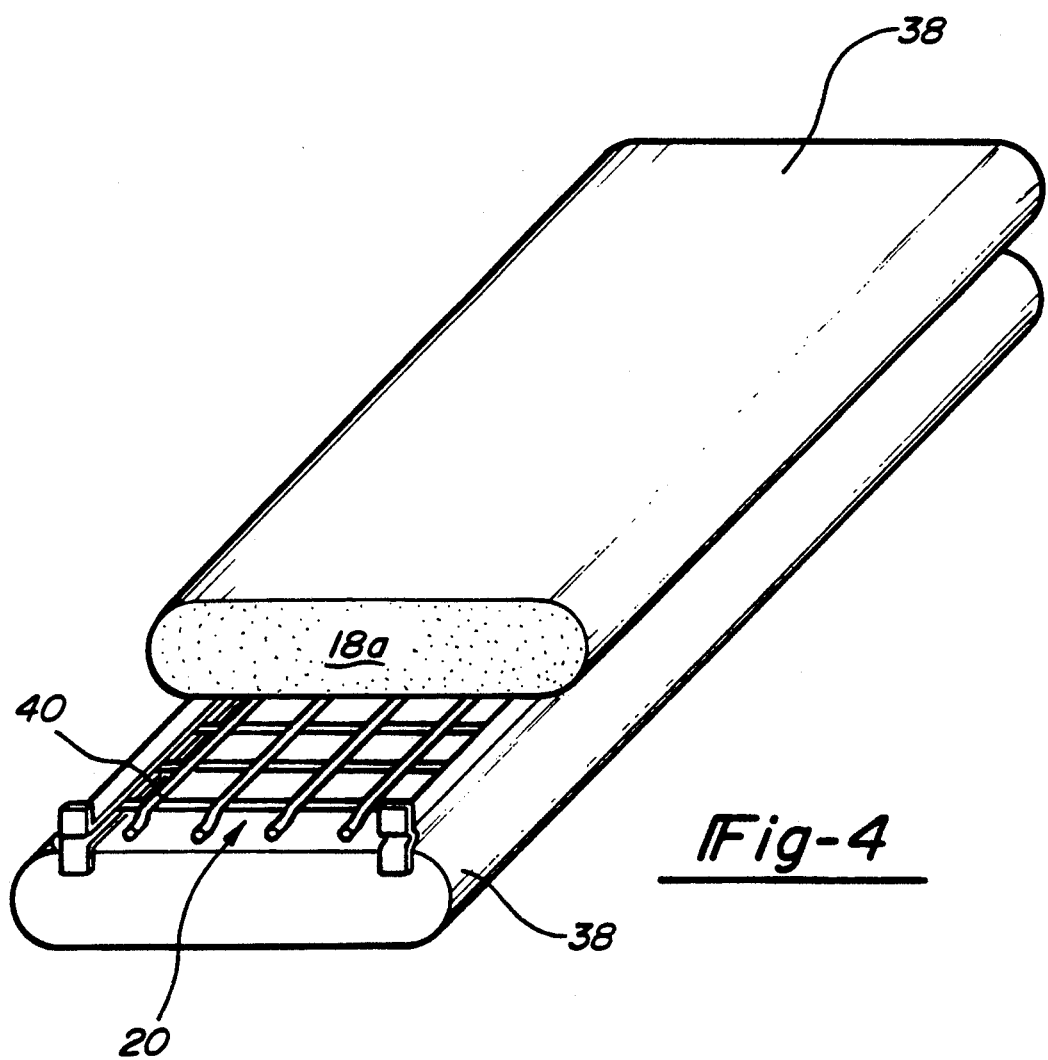
FIG. 4 is a more detailed view of the structure illustrated in FIG. 2.

The chamber parts 18a are defined by thin partition walls 38 separating them from the ducts 20, such walls being able to be deformed practically without any pressure, spacers, of which only one is indicated and which are clearly illustrated in FIG. 4 at 40, being arranged in the ducts 20, such spacers being fixedly connected with the surrounding walls 38 and at the edge of the heat storage core 16 with the core casing 26. In addition to the improvement to be described in what follows for the mechanical strength, the spacers 40 function to produce a turbulence on passage of a medium through the flow path.

The chamber parts 18a have a flat cross section, generally in the form of flattened rectangles or ovals, the long sides of the cross sections of adjacent chamber parts 18a being opposite to each other.

In the illustrated working embodiment of FIG. 3 there is the difference from the embodiment of the invention in accordance with FIG. 2 that a uniform chamber 18b is provided for the heat storage medium, which is enclosed by the core casing 26. In the inner space of the chamber 18 filled by the heat storage medium the ducts 20 are delimited by membrane-like spacers, in the form of hose, or support elements with a flattened cross sectional configuration with a distance between them and with spaced walls 21.

The flow path constituted by the collecting spaces 28 and 30 and the ducts 20 for the heat transfer medium in the heat storage core 16 is connected with an inlet duct 32 and a return duct 34, which open into the inner container 14, that is to say either the inlet duct 32 opens into the one collecting space 28 and the return duct 24 opens into the other collecting station 30, as is illustrated, or the two ducts open into one of the two collecting spaces, which is then divided into an inlet and a return chamber; then the other collecting station functions as a direction changing chamber for the heat transfer medium.

Between the two opposite end surface 22 and 24 the core has a surface 35, which extends with a small clearance parallel to the oppositely placed surface 37 extending between opposite ends of the inner container 14 so that between the two surfaces 35 and 37 an insulating gap 39 is formed, which protects the heat storage medium 16 against overheating during bake out.

In the modified design illustrated in FIG. 2 it is necessary for the core casing 26 and therefore also the surface 35 to be open so that the insulating gap 39 constitutes a part of the flow path for the heat transfer medium.

In the case of a closed design of the core casing 26 as is necessary in the modified design of the storage core 16 in accordance with FIG. 3, and which may be employed in the design in accordance with FIG. 2 as well, it is possible for the insulating gap 39 to be shut off. However, it may be open in the case of the collecting spaces 28 and 30 also for this reason also constitute a part of the flow path for the heat transfer medium. The insulating gap 39 may however also be filled with a microporous material in order to constitute permanent insulation between the inner container 14 and the heat storage core 16.

Between the outer container 12 and the inner container 14 there is an insulating zone 36, which is evacuated and may or may not contain microporous material. This insulating zone 36 is traversed by the inlet duct 32 and the return duct 34, which terminate outside the outer container 12.

Between the core casing 26 and the inner container 14 there are support or bearer elements 42 manufactured of sufficiently heat resistant and preferably thermally insulating material.

After the complete assembly of the heat storage means as described in the above for permanent thermal insulation of the heat storage core 16 the above described bake out and evacuation of the insulating zone 36 is performed, for which purpose the complete heat storage means is for instance put in an oven for the prescribed bake out time.

For the protection of the heat storage core 16 it is possible for instance for the flow path and therefore also the space, which constitute and insulating space, between the inner side of the inner container 14 and the outer side of the core casing 26 to be filled with a thermally insulating gas or with a liquid, such as ethylene glycol, whose variation in vapor pressure as dependent on temperature compensates for the vapor pressure in the heat storage medium during bake out. However, it is also possible for a thermally insulating vacuum to be produced in the flow path, it then possibly being necessary for the inlet duct 32 and the return duct 34 to be hermetically shut off.

If the chamber parts 18 are deformed by an elevated vapor pressure of the heat storage medium, it is possible for mutually adjacent surrounding walls 38 to bear against each other.

However it is possible as well for a coolant, such as a mixture of water and ethylene glycol, to circulate through the flow path in order to maintain the insulating space at a temperature, which does not exceed the operational temperature. In this respect it is possible for the coolant to be heated up to the desired temperature of 120° C. prior to the bake out and the evacuation so that in the initial phase of the bake out the inner container 14 and therefore the inner limit or surface of the insulating zone 26 is also heated from the inside and therefore the bake out temperature is more rapidly attained. If after this the coolant is maintained at this temperature of for instance 120° C. by the heat which is to be removed, the heat storage core will be protected against the damaging effects of heat. However, the said coolant at a temperature of 120° C. has a vapor pressure of 2 bar which the surrounding walls 38 are not able to resist alone. The forces then acting on the surrounding walls 38 are taken up as tensile force by the spacers 40.

A further possible form of the invention, not illustrated, is such that the insulating gap 39 is separated from one of the collecting spaces 28 and 30 so that flow through the insulating gap 39 is prevented, while the coolant may flow via the duct 2 through the heat storage core and maintain it at the desired low temperature. The coolant which is stationary in the insulating gap 39 may however be heated up so that an undesired cooling of the inner container 14 is prevented.

A particularly economic way of producing the heat storage means is one in which the heat storage core is preheated in a preheating station, for instance, to its maximum permitted temperature and the heat storage means is then moved into a bake out station, where the insulating zone is heated to the bake out temperature and is evacuated.

I claim:

1. A heat storage means for vehicle heating systems run on exhaust gases from an engine comprising a housing including an outer container and an inner container arranged in spaced relationship therein, said containers defining between them an insulating zone, a heat storage core arranged in the inner container in which at least one chamber for a heat storage medium is separated by a partition wall from at least one path for a heat transfer medium, and an inlet duct and outlet duct for the heat transfer medium are connected with the flow path and extend outwards through the insulating zone, said inlet and outlet ducts receiving exhaust gases, said heat storage core being supported with a clearance from an inner wall surface of the inner container, and a storage member for supporting said storage core, said support member having a grid like pattern and positioned between storage core members such that upon exertion of a force on said partition walls, said support member takes up the force to protect against damage of said partition walls.

2. The heat storage means as claimed in claim 1, wherein the space between the inner container and the heat storage core is connected with the flow path.

3. The heat storage means as claimed in claim 2, wherein said support member is of a thermally insulating material which is thermally stable generally at the bake out temperature range.

4. A heat storage means as in claim 1, heat storage core chamber for the heat storage medium is divided up into a plurality of chamber parts which are divided from each other by the flow path for the heat transfer medium, said chamber parts are surrounded by thin partition walls and have a flat cross section, the major sides of the respective cross sections being turned towards each other, and a claimed in claim 16 wherein the distance between these flat cross section sides of the adjacent chamber parts is so sized that under the influence of the vapor pressure tending to increase the cross section of the chamber parts these cross section sides bear against each other during bake out before the extension of the walls of the chamber parts exceeds a safety threshold.

5. A heat storage means as in claim 1, heat storage core chamber for the heat storage medium is divided up into a plurality of chamber parts and the flow path is divided up into a plurality of ducts extending between these chamber parts, and furthermore the ducts and the chamber parts are separated from each other by in partition walls, the partition walls being connected with each other by spacers.

6. The heat storage means as claimed in claim 5, wherein the spacers are connected with the partition walls in a tension transmitting manner.

7. The heat storage means as claimed in claim 5, wherein the spacers are arranged in the ducts for the heat transfer medium.

* * * * *

UNITED STATES PATENT AND TRADEMARK OFFICE
CERTIFICATE OF CORRECTION

PATENT NO. : 5,279,355

DATED : Jan. 18, 1994

INVENTOR(S) : Oskar Schatz

It is certified that error appears in the above-indentified patent and that said Letters Patent is hereby corrected as shown below:

On the Title Page, (Abstract, Page 17, Line 5) "in" should be --an--;

Col. 1, Line 11, "in" should be --an--;

Col. 2 Line 20, after "very", insert --high--;

Col. 2, Line 55, after "the", delete "a";

Col. 3, Line 9-10, "developments" should be --development--;

Col. 3, Line 15, after "brake", insert --out--;

Col. 3, Line 58, "the" should be --then--;

Col. 3, Line 58, "up" should be --out--;

Col. 4, Line 56, after "with", delete "a";

UNITED STATES PATENT AND TRADEMARK OFFICE
CERTIFICATE OF CORRECTION

PATENT NO. : 5,279,355

DATED : Jan. 18, 1994

INVENTOR(S) : Oskar Schatz

It is certified that error appears in the above-indentified patent and that said Letters Patent is hereby corrected as shown below:

Col. 5, Line 30, "in" (first occurrence) should be --of--;

Col. 5, Line 46, "an" should be --a--;

Col. 7, Line 5, "surface" should be --surfaces--;

Col. 7, Line 35, "42" should be --40--;

Col. 7, Line 47, "and" should be --an--;

Col. 8, Line 1, Claim 4, after "claim 1," insert --wherein said--;.

Col. 8, Lines 8-9, Claim 4, after "a", delete "claimed in claim 16 wherein the";

Col. 9, Line 2, Claim 5, after "claim 1," insert --wherein said-- and

Col. 9, Line 6, Claim 5, "in" should be --thin--.

Signed and Sealed this

Twenty-eight Day of February, 1995

Attest:

BRUCE LEHMAN

*Attesting Officer*  *Commissioner of Patents and Trademarks*